United States Patent [19]
Regueiro

[11] Patent Number: 5,327,864
[45] Date of Patent: Jul. 12, 1994

[54] STRATIFIED-CHARGE INTERNAL COMBUSTION ENGINE WITH FUEL INJECTION AND DUAL IGNITION

[75] Inventor: Jose F. Regueiro, Rochester Hills, Mich.

[73] Assignee: Chrysler Corporation, Highland Park, Mich.

[21] Appl. No.: 28,070

[22] Filed: Mar. 8, 1993

[51] Int. Cl.⁵ .................... F02B 19/00; F02B 3/00; F01F 3/26; F02P 15/02
[52] U.S. Cl. .................... 123/260; 123/276; 123/299; 123/310
[58] Field of Search ............... 123/295, 298, 299, 301, 123/302, 310, 276, 260, 305, 638, 279

[56] References Cited

U.S. PATENT DOCUMENTS

| | | | |
|---|---|---|---|
| 2,111,601 | 3/1938 | Rabezzana et al. | 123/310 |
| 2,606,538 | 8/1952 | Malin | 123/299 |
| 2,620,781 | 12/1952 | Peterson | 123/279 |
| 3,945,365 | 3/1976 | Regueiro | 123/260 |
| 4,011,841 | 3/1977 | Sato et al. | 123/260 |
| 4,111,177 | 9/1978 | Regueiro | 123/295 |
| 4,534,322 | 8/1985 | Matsuda et al. | 123/310 |
| 4,594,976 | 6/1986 | Gonzalez | 123/260 |
| 4,742,804 | 5/1988 | Suzuki et al. | 123/310 |
| 4,924,823 | 5/1990 | Ogura et al. | 123/310 |
| 5,115,774 | 5/1992 | Nomuca et al. | 123/276 |
| 5,163,396 | 11/1992 | Fukuda et al. | 123/310 |
| 5,259,348 | 11/1993 | Kobayashi et al. | 123/302 |

FOREIGN PATENT DOCUMENTS

| | | | |
|---|---|---|---|
| 375710 | 10/1939 | Italy | 123/276 |
| 521954 | 6/1940 | United Kingdom | 123/276 |

OTHER PUBLICATIONS

*Automotive Industries*, John McElroy, "Alternative Engines", Jan., 1980, pp. 43–48.
*Technology Review*, John Heywood and John Wilkes, "Is There a Better Automobile Engine?", Nov./Dec. 1980, pp. 19–29.
*Automotive Engineering*, Stuart Birch, Jack Yamaguchi, Al Demmier & Kevin Jost, "Vehivles/Engines", Jun. 1992, vol. 100, No. 6, pp. 46–47.
*Diesel & Gas Turbine Worldwide Catalog*, 1/1985 Edition vol. 50, pp. 1268, 1315, 1319, 1321.

*Primary Examiner*—E. Rollins Cross
*Assistant Examiner*—Thomas N. Moulis
*Attorney, Agent, or Firm*—Kenneth H. MacLean

[57] ABSTRACT

A stratified-charge internal combustion engine (10) with fuel injection and dual ignition has a fuel injector (60) and two spark plugs (70) and (72) mounted in a cylinder head (16). The cylinder head (16) forms a combustion chamber (44) in conjunction with the cylinder (14) and piston (18). The spark plugs sequentially ignite the fuel plume (64, 66) emitted by the fuel injector simultaneously with the injection of the fuel. The piston (18) has a recess (80) that has its narrow portion in proximity to the injector and spark plug (70) and wider portion aligned under spark plug (72).

22 Claims, 3 Drawing Sheets

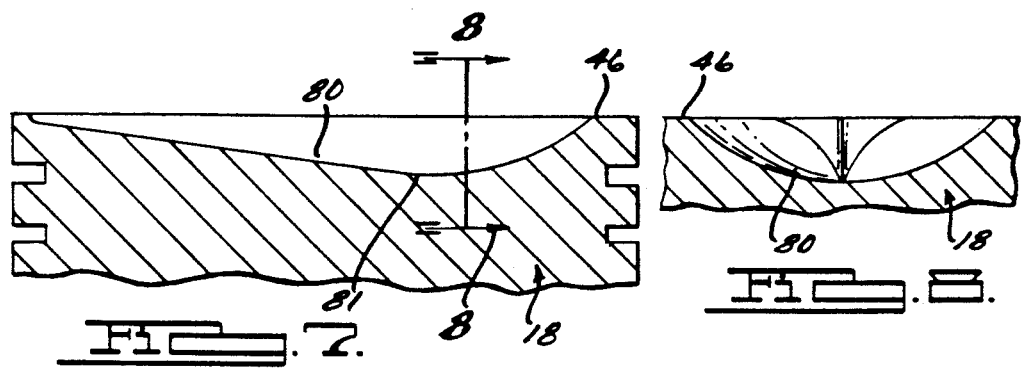
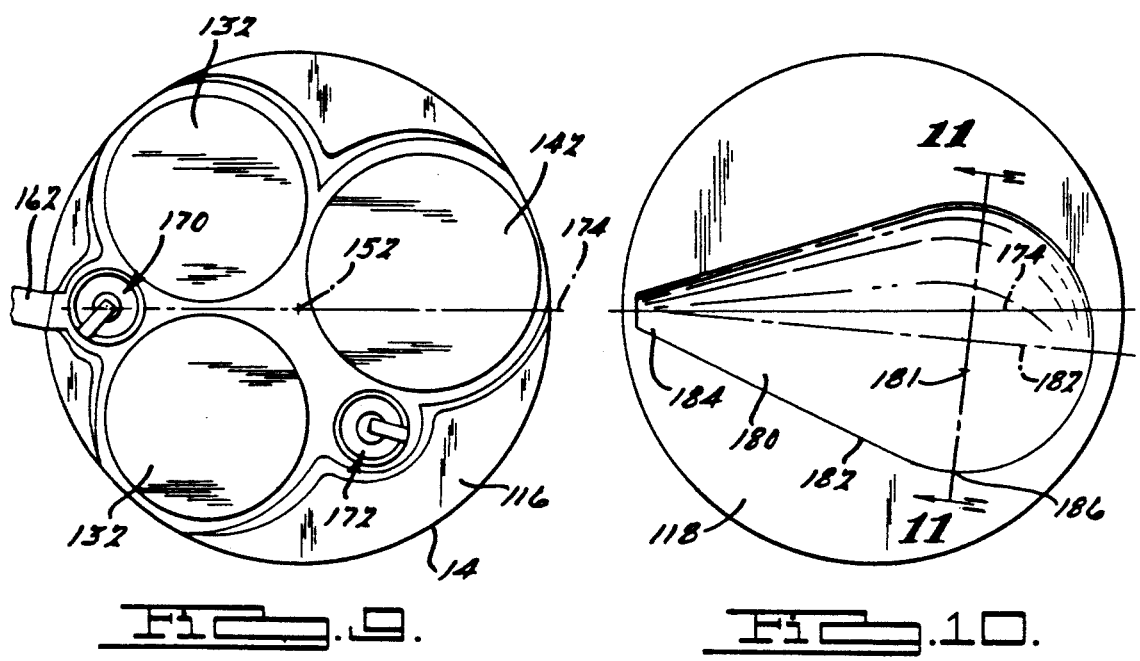
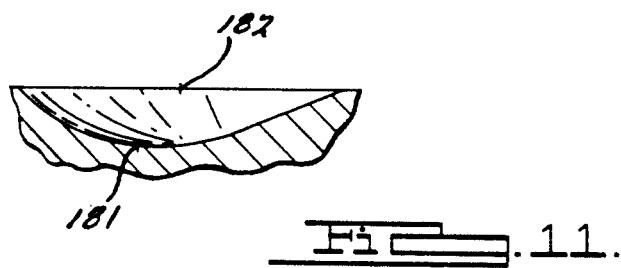

STRATIFIED-CHARGE INTERNAL COMBUSTION ENGINE WITH FUEL INJECTION AND DUAL IGNITION

TECHNICAL FIELD

The field of this invention relates to internal combustion engines and more particularly to a multi-valve fuel-injected stratified-charge internal combustion engine.

BACKGROUND OF THE DISCLOSURE

Stratified-charge internal combustion engines have been developed and tested for many years. The stratified-charge engine runs lean like a diesel engine at all times with an unthrottled air supply and with the air and fuel being mixed inside the chamber. Like the Otto cycle spark ignition gasoline engine, the stratified-charge engine has its combustion cycle or power stroke initiated by electrical igniters.

Diesel engines with compression-ignition have traditionally used high compression ratios to assure short ignition delays and quick ignition to address the problems of cold starting. The compression ratios have often been 16:1 for open chamber designs and 21:1 for divided chamber designs. The high compression ratios are accompanied with large peak firing pressures within the combustion chamber upon the compression-ignition of the fuel and air mixture. The large peak firing pressures require stouter and heavier engine structure to withstand the high firing pressures. The structural requirements add to the overall weight, bulk and cost of the engine. Furthermore, because of this requirement, gasoline and diesel engines did not have many components that were interchangeable. Neither engine could be economically and feasibly converted to the other type of engine.

A spark-ignition gasoline engine however has octane requirements. Many of the current engines can barely operate at a 10:1 compression ratio on 87 R+M/2 octane fuel. Many of these engines require a knock sensor intended to detect early detonation and automatically retard the spark timing if required.

Direct-injection stratified-charge (DISC) engines have always held out the promise of eliminating the restrictive octane requirements of spark ignition engines while eliminating the disadvantages of high combustion pressures found in diesel engines and providing smooth and quiet combustion by igniting the mixture with a spark and doing so with compression ratios and firing pressures at levels intermediate between those used in compression-ignition and spark-ignition engines. So far, results of practical applications have not been encouraging. Multi-fuel capability, theoretically possible with these concepts, has also been disappointing. A direct-injection stratified-charge engine can be much lighter compared to a diesel engine of similar displacement thereby increasing the effective power output per unit weight of engine.

Many attempts at direct-injection stratified-charge (DISC) engines have been made in the past with little commercial success. The performance results have always been disappointing particularly in the field of emission control. They were hampered, as proven by modern technology, by lack of air capacity due to their two OHV-pushrod designs and their hopelessly inadequate injection and ignition systems.

What is needed is a direct-injected stratified-charge engine that has improved energy and environmental performance under various conditions, achieved by solving the air capacity, injection constraints, ignition drawbacks, and combustion problems which afflicted the conventional engines.

SUMMARY OF THE DISCLOSURE

In accordance with one aspect of the invention, a direct-injection stratified-charge engine has a cylinder with a side wall, a piston slidably disposed in the cylinder for reciprocal motion along a central longitudinal axis of the cylinder. A cylinder head is secured over the cylinder to form a combustion chamber with the cylinder and piston. At least one intake valve and preferably two allow air to be admitted into the combustion chamber. At least one and preferably two exhaust valves allow the spent gases to exit the combustion chamber. A fuel injector device is mounted for spraying an expanding fuel stream from a nozzle thereof into the combustion chamber from a peripheral section of the combustion chamber substantially spaced from the central axis of the cylinder toward said cylinder side wall at an approximately transverse direction with respect to said central axis of the cylinder. The piston has a concave recess section with a variable width. The width is relatively narrow in proximity with the fuel injector device and becomes wider away from the fuel injection means. The concave recess has a variable depth. The depth is relatively shallow in proximity with the fuel injector device and becomes deeper at a point away from said fuel injector device.

A fuel igniter device is mounted within the combustion chamber for sequentially igniting said fuel sprayed into said combustion chamber at two different times with an initial ignition and a second ignition, such that the initial ignition occurs after said fuel injection means injects a first amount of fuel into the combustion chamber with said fuel injector device injecting additional fuel into said combustion chamber after the initial ignition occurs and said second ignition occurs after the additional fuel is sprayed into the combustion chamber.

In the preferred embodiment, an igniter device provides an initial ignition and a secondary ignition. Preferably the ignition device includes a first igniter located in proximity to the nozzle of the fuel injector means and a second igniter located downstream of the expanding fuel stream from the first igniter with the first igniter providing the initial ignition and the second igniter providing the sequential second ignition. Both igniters are substantially vertically aligned directly above the piston within the confines of the projection or extension of the cylinder in a conventional engine arrangement with the combustion chamber directly above the piston.

The fuel injector is preferably aimed to spray the additional fuel through a flame front caused by the initial ignition of the first amount of fuel injected into said combustion chamber. The additional fuel is preferably sprayed to reach the second igniter before the flame front, such that the additional fuel is ignited downstream of said flame front of the initial ignition by the second igniter, while it undergoes preflame reactions as it passes through the flame front.

In a preferred embodiment, the intake valves, cylinder head and piston are constructed to provide air tumble within said combustion chamber about an axis that is substantially transverse to the central longitudinal axis of said cylinder before the initial ignition.

It is desirous that the cylinder head is constructed to provide the intake and exhaust valves to be set at a valve included angle less than 30° and preferably in the range of approximately 20° to approximately 25°. The internal combustion engine may have a bore/stroke ratio of less than one (unity), and preferably the ratio being in the range of approximately 0.85 to approximately 0.90.

In one embodiment, the fuel injector is mounted in the cylinder head in a side wall of said combustion chamber at an approximately transverse direction with respect to the central longitudinal axis of the cylinder. The concave recess in the piston is eccentrically positioned with respect to a central horizontal axis of the piston. The eccentrically positioned recess has a variable width with the width being relatively narrow in proximity with said fuel injector and becoming wider away from said fuel injector. The concave recess also has a variable depth with the depth being relatively shallow in proximity with the fuel injector and becoming deeper at a point away from the fuel injector. The recess has a longitudinal axis that is substantially aligned with the transverse direction of the expanding fuel stream. It is desirable that the first and second igniters are also aligned above the longitudinal axis of the recess in the piston and within the sprayed expanding fuel stream.

According to another aspect of the invention, an internal combustion engine has a fuel injector device for spraying an expanding fuel stream from a nozzle thereof into the combustion chamber from a peripheral section of the combustion chamber substantially spaced from the central axis of said cylinder toward said cylinder side wall at an approximately transverse direction with respect to the central longitudinal axis of the cylinder. The piston has a concave recess section with a variable width and variable depth. The intake valves, cylinder head and piston are constructed to provide air tumble within the combustion chamber about an axis that is substantially transverse to the central longitudinal axis of said cylinder before said initial ignition. Furthermore the second igniter is positioned to be approximately aligned over the deepest portion of the combustion chamber.

BRIEF DESCRIPTION OF THE DRAWINGS

Reference now is made to the accompanying drawings in which:

FIG. 7 is a cross-sectional view taken along line 7—7 shown in FIG. 7;

FIG. 8 is a cross-section view taken along line shown in FIG. 7;

FIG. 9 is a plan view similar to FIG. 5 illustrating a second embodiment of the invention;

FIG. 10 is a plan view of the second embodiment of the piston; and

FIG. 11 is a cross-sectional view taken along line 11—11 shown in FIG. 10

DETAILED DESCRIPTION OF THE PREFERRED EMBODIMENT

Figure 1:
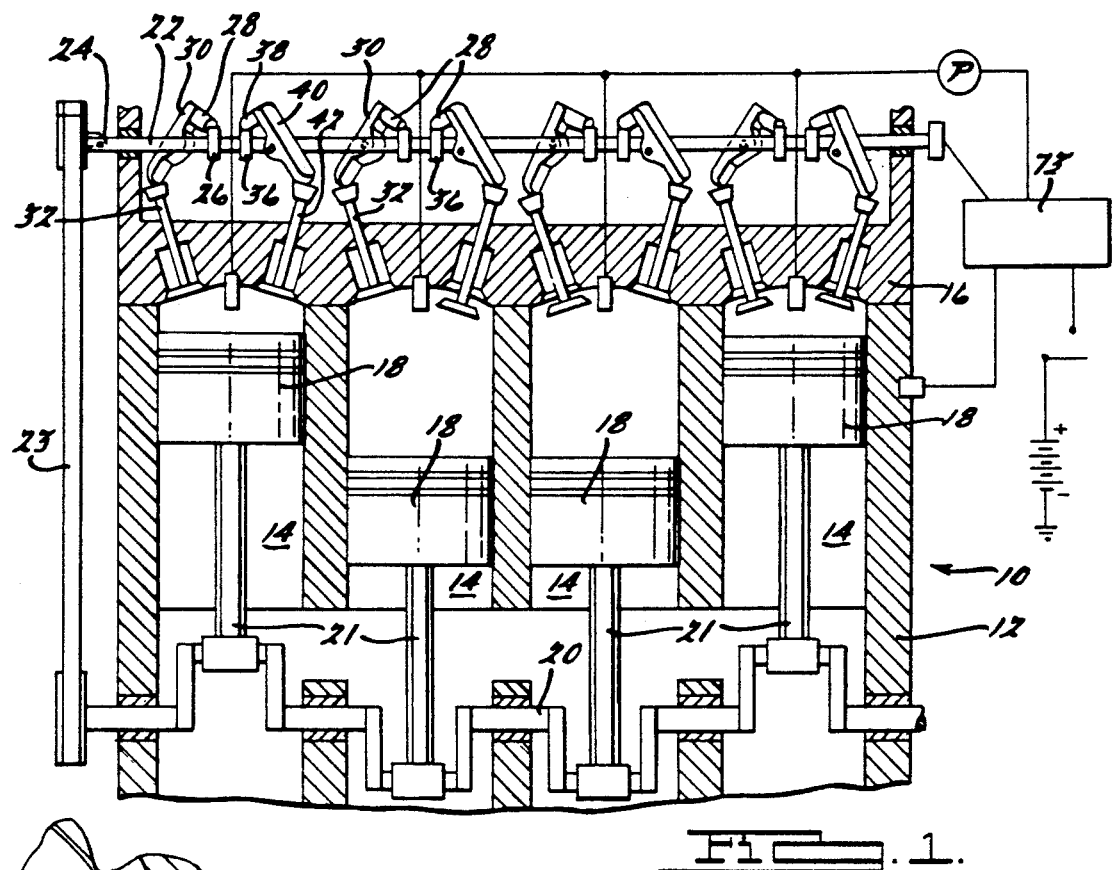
FIG. 1 is a schematic view of a four cylinder internal combustion engine incorporating one embodiment of the invention.
Figure 5:
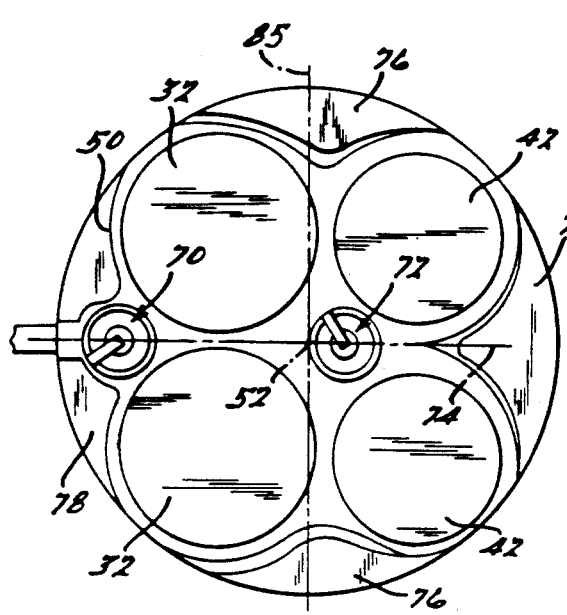
FIG. 5 is a cross-sectional plan view taken along line 5—5 shown in FIG. 4.

Referring now to FIG. 1, a four-valve twin-overhead cam fuel-injected stratified-charge engine 10 is schematically represented. The direct injection stratified-charge engine 10 includes an engine block 12 with a plurality of cylinders 14. A cylinder head 16 is mounted on block 12. The cylinders 14 house pistons 18. Each piston 18 is conventionally connected to a crankshaft 20 through connecting rods 21. The crankshaft 20 is connected via a conventional timing mechanism (gear, chain or belt 23) to twin overhead camshafts 22 and 24. Camshaft 22 has cams 26 that operate tappets 28 that in turn pivot rocker arms 30. The arms 30 operate intake valves 32. Camshaft 24 similarly has cams 36 that operate tappets 38 that in turn pivot rocker arms 40. Rocker arms 40 operate exhaust valves 42. In other preferred applications the tappets 28 and 38 may bear directly against the valves 32 and 42 (direct-acting double-overhead camshaft). As shown in FIG. 5 a pair of intake valves 32 and a pair of exhaust valves 42 are associated with each cylinder 14. The engine 10 has a bore/stroke ratio preferably being less than unity and desirably in the range of approximately 0.85 to 0.90. Reference to direction such as top, bottom, up, down, vertical, or horizontal will be made relating to the engine as shown in FIG. 1 with its conventional arrangement. It should be understood that the engine itself may be repositioned such as rotated about its longitudinal or transverse axis without affecting the invention.

Figure 4:
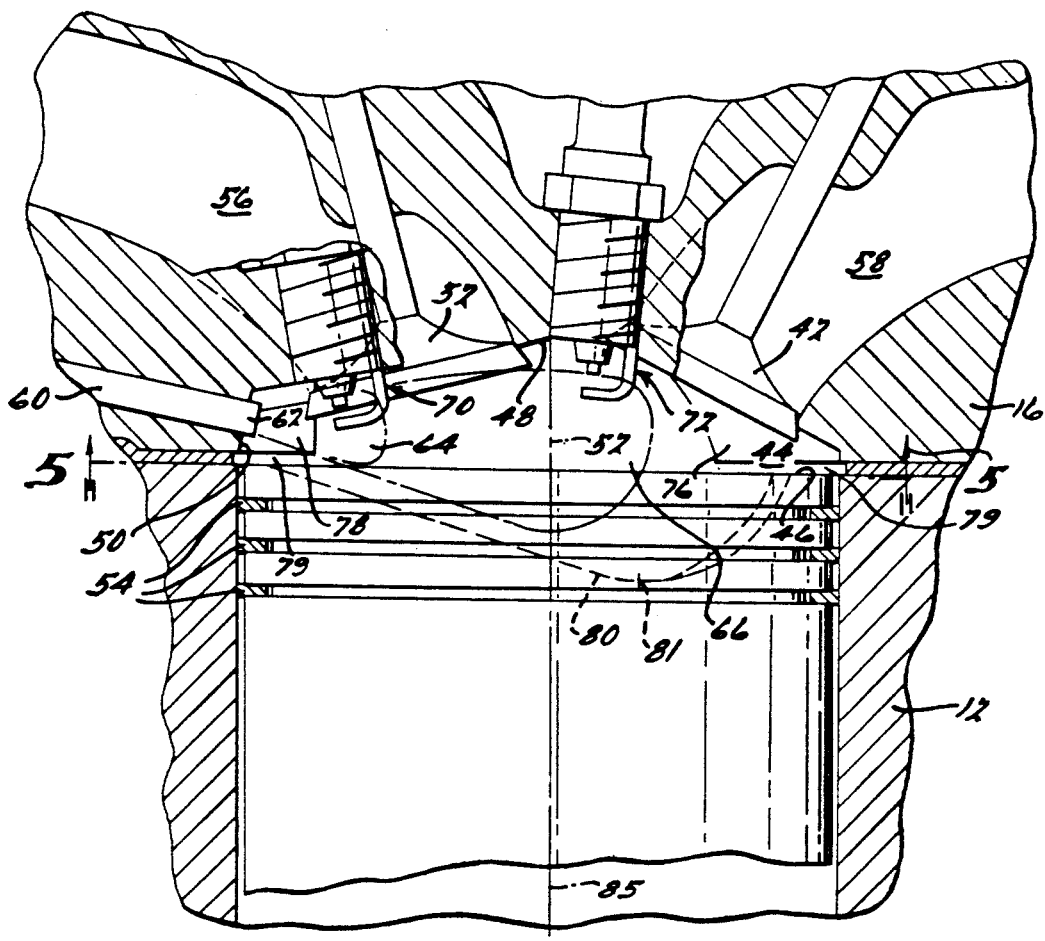
FIG. 4 is a view similar to FIG. 3 schematically illustrating the injected fuel stream at the time of the initial and second ignition.
Figure 6:
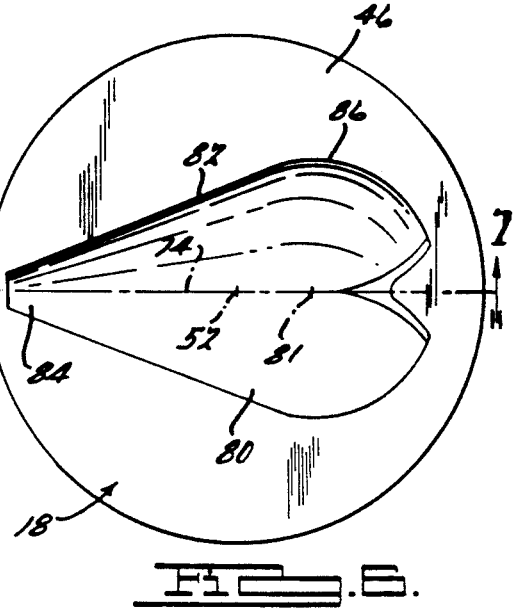
FIG. 6 is a plan view of the piston shown in FIG. 4.

Reference is now made to FIGS. 4, 5, and 6 which illustrates one cylinder 14 and piston 18 assembly. The other three cylinder and piston assemblies shown in FIG. 1 are similar in structure and function, and therefore, are not individually described. The cylinder 14, piston 18, and cylinder head 16 form a combustion chamber 44. The piston 18 has a top surface 46 that defines the bottom wall 46 of the chamber 44. The bottom of the cylinder head 16 forms the top surface 48 of the chamber 44. The cylinder 14 and cylinder head 16 together form the side wall 50 of chamber 44. The longitudinal central axis of the cylinder 44 is indicated at 52. The piston 18 has a ring pack 54. The cylinder head 16 has intake ports 56 and exhaust ports 58 in communication with a respective pair of intake valves 32 and a pair of exhaust valves 42. The valves 32 and 42 have a maximum valve included angle preferably less than 30° and desirably in the range between approximately 20° and 25° as shown in FIG. 4.

A fuel injector 60 is mounted at the side wall 50 of the combustion chamber 44 with its nozzle 62 aimed toward the central axis 52 of the cylinder 14 at a small acute angle to a horizontal plane transverse to the axis 52. The injector 60 is preferably a conventional single-hole pintle-type. Other conventional type of injectors may be substituted such as a simple outward-opening type as long as it produces a fairly narrow injection plume as schematically shown as 64 and 66 in FIG. 4 during different stages of growth.

Each combustion chamber 44 has two igniters in the form of two spark plugs 70 and 72 mounted in the cylinder head 16 substantially vertically aligned above the piston. In other words, the spark plugs are aligned with and positioned within a projection or extension of the cylinder. Each spark plug 70 and 72 is aligned in the direction that the nozzle directs the fuel stream or plume, i.e. along axis 74 as shown in FIG. 5. The spark plug 70 is located in proximity to the nozzle 62 and is sequenced to ignite before spark plug 72. The sequence is determined by an electronic ignition controller 73 connected to each spark plug 70 and 72 schematically shown in FIG. 1. The spark plug 72 is more centrally located toward the central axis 52 but on the other side of central axis 52 than spark plug 70.

Figure 2:
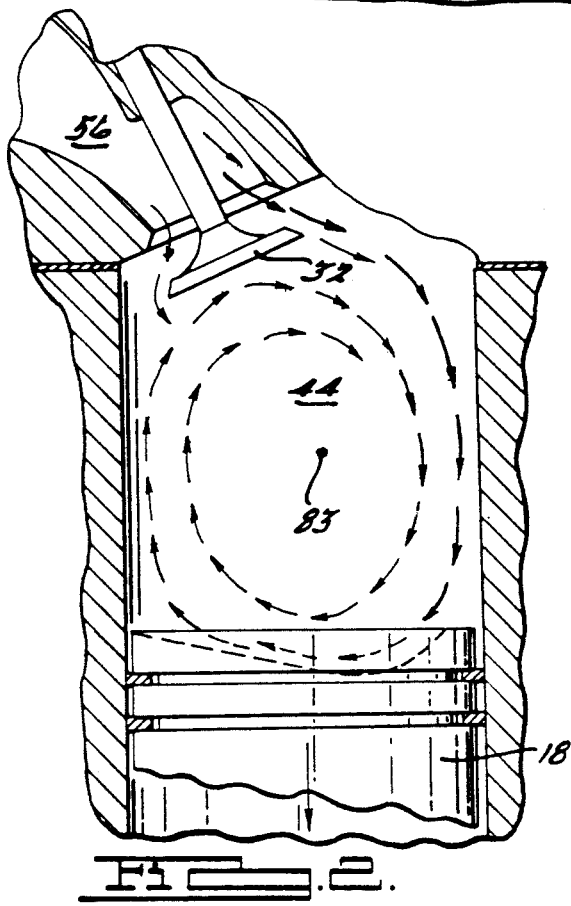
FIG. 2 is an enlarged schematic view of one cylinder of the internal combustion engine shown in FIG. 1 illustrating the intake stroke and tumbling air motion.
Figure 3:
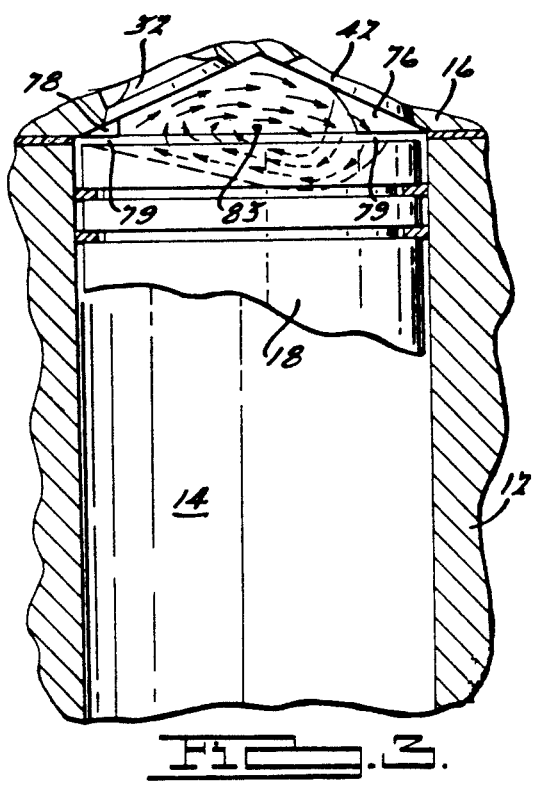
FIG. 3 is a view similar to FIG. 2 illustrating the compression stroke and continuously accelerated tumbling air motion.

The peripheral sections 76 and 78 of the cylinder head 16 form combustion chamber filler used to reduce the clearance volume in the cylinder head 16 to achieve high compression ratios while having a fair amount of clearance volume in the piston top and forms so called squish areas 79 with the piston top surface 46 when the piston is at top dead center as shown in FIGS. 3 and 4. At the squish areas, when the piston approaches TDC in the compression stroke, a considerable amount of additional, radially-inward air turbulence is generated to further increase the fuel and air mixing rate to further accelerate the combustion process, apart from increasing the ratio of active to inactive air available for combustion. The clearance volume in the cylinder head 16 is needed to allow the cone-shaped fuel injection plume 66 to develop and remain airborne with minimum contact with the surfaces of the cylinder head 16. The contour of the cylinder head sections 76 and 78 also help the air current within the cylinder to turn the air around for a tumbling motion about a horizontal axis 83 as shown in FIGS. 2 and 3.

Referring now to FIGS. 4, 6, 7 and 8, the piston 18 has a concave recess 80 in the top surface 46. The recess 46 has a variable width. The width is relatively narrow in proximity with the fuel injector device and becomes wider away from the fuel injection means. The concave recess also has a variable depth. The depth is relatively shallow in proximity with the fuel injector device and becomes deeper at a point away from said fuel injector device. The deepest section 81 is axially aligned under center axis 74 and positioned on the other side of center axis 52 from the fuel injector nozzle 62 and spark plug 70. The periphery 82 is tear-drop shaped with the narrow section 84 positioned in proximity to the spark plug 70 and injector nozzle 62. The wide portion 86 is axially aligned with the deepest section 81. The spark plug 72 is positioned substantially above a position between the cylinder axis 85 and the widest and deepest section 81 and 86. Consequently, the spark plug 72 is also positioned substantially above the deepest part of the combustion chamber. The recess 80 is contoured in both directions along axis 74 as shown in FIG. 7 and transverse to axis 74 as shown in FIG. 8.

In operation, the engine has an intake stroke as illustrated in FIG. 2 with the air passing through the open intake valve ports 56 into the combustion chamber 46. The intake ports 56 and chamber 46 are shaped to produce and promote continuation of vertical air tumble about the horizontal axis 83 which is parallel to the centerline 85 of the engine 10. The air tumble continues during the compression stroke as illustrated in FIG. 3. Fuel is then injected and subsequently immediately ignited as illustrated in FIG. 4. The injection is timed substantially similarly to the spark timing of conventional spark ignition engine and ignited by the initial source of ignition, i.e. the spark plug 70. The fuel is injected on a path essentially in line with the air flow in proximity to the nozzle at the top of the combustion chamber. The fuel injected up to the moment of initial ignition is a small fraction of the total fuel injected during the cycle and is referred to as the pilot fuel. The pilot fuel creates the illustrated plume 64.

The placement of the pilot fuel charge mixing with the rapidly moving air due to both the tumble motion and the micro-turbulence generated by the air being rapidly moved inward from the squish areas 76 during the compression stroke toward the top dead center position assures proper mixture of fuel and air by the time the mixture reaches the spark plug 70. The timing of the ignition of spark plug 70 by electronic ignition controller 73 coincides when the plume appears as indicated by numeral 64. The proper mixture assures reliable initial ignition regardless of engine load, speed, or ambient temperature. The pilot fuel burns at or downstream of the spark plug 70. Contrary to a diesel engine, the pilot fuel burns quietly because there is no chemical ignition delay. Production of oxides of nitrogen during the pilot fuel burn phase is also minimal.

After the pilot charge is initially ignited a flame front is created with the flame front moving with the tumbling air flow away from the injector (from left to right as illustrated in FIG. 4 and bending upwardly toward the secondary or sequential source of ignition, namely spark plug 72). The fuel molecules and air molecules are being violently moved due to the flame front, squish and tumble. Injection of the main change follows smoothly and in an uninterrupted fashion after the pilot charge. The injection rate of the main charge is much higher than that of the pilot charge. The main charge portion is injected from the nozzle 64 into the burning initial charge and through the flame front to create plume 66 extending toward the spark plug 72. The plume undergoes pre-flame reactions while passing through the flame front. The front end of the main charge or plume 66 is then ignited by the second ignition coming from spark plug 72 as determined by electronic ignition controller 73. The injection of fuel continues until termination. The sprayed injected fuel is always meeting and mixing with fresh air right in front of the injector caused by the tumbling motion (shown as a clockwise rotation in FIGS. 2 and 3), with the rate of the final phases of combustion is controlled essentially by the rate at which the remaining fuel is injected into the chamber.

The exhaust cycle is conventional with exhaust valves 42 opening during the exhaust cycle to let the exhaust gases exit through exhaust ports 58.

A second embodiment is illustrated in FIGS. 9, 10 and 11. In this embodiment, only a single exhaust valve 142 is mounted in a slightly different cylinder head 116. The secondary ignition source is a spark plug 172 that is mounted eccentrically with respect to the central transverse axis 174 of the chamber 44. The recess 180 in piston 118 is similar to the one in the first embodiment in that it has a variable width and depth. The periphery 182 is tear-drop shaped with the narrow section 184 positioned in proximity to the spark plug 170 and injector nozzle 162 interposed between two intake valves 132. The width increases away from the fuel injection means. The recess 180 in piston 118 is also eccentrically rotated such that its axis 182 is canted with respect to axis 174. The concave recess has a variable depth. The depth is relatively shallow in proximity with the fuel injector device and becomes deeper at a point away from said fuel injector device. The wide portion 186 is axially aligned with the deepest section 181. Furthermore, as shown in FIG. 11 the recess should preferably be asymmetrically shaped with the deepest part 181 of said recess offset from the longitudinal axis 182 of said recess. The spark plug 172 is eccentrically positioned from the longitudinal axis 182 of said recess and is offset toward the same side of the longitudinal axis 182 of said recess at the deepest section 181 of the recess. The nozzle may be canted such that it directs the expanding plume along canted axis 182 of the recess 180 substantially transverse to the central axis 52 of cylinder 44.

It is in this fashion that a very quick overall combustion can be achieved and that while proceeding rapidly, produces a smooth, clean and efficient burn, with low emissions of hydrocarbons, smoke, and particulates. By achieving reliable and fast ignition of the pilot fuel as well as fast overall combustion, it is quite possible that the injection and primary ignition can be achieved at a more retarded timing as is the case presently possible with compression ignition or spark ignition engines. The retardation can further reduce the combustion and mechanical noise, mechanical stresses, wear and $NO_x$ production without an increase in hydrocarbons, smoke and particulates typical of a compression-ignition engine at retarded injection timings; provided of course, that the engine uses modern high-pressure injection and ignition systems with electronic controls.

The limited initial pilot amount of fuel reduces the knocking or noise generated by the ignition process. Furthermore, since the initial amount of fuel being ignited is substantially less than the full amount of fuel consumed in the combustion cycle and also less than the equivalent amount of fuel injected during the delay periods of a common diesel engine, the amount of $NO_x$ generated by the initial ignition is reduced. Furthermore, the firing pressure produced by this combustion process, with very rapid burning of the main fuel charge just past TDC and little negative combustion work before TDC, reduces the structural stress on the engine and results in lower friction and wear as well as improved fuel consumption. With positive spark ignition, the engines do not require the high compression ratios of typically equivalent diesels, which also reduces the firing pressures, and by providing larger combustion chamber volumes, helps to maintain the fuel airborne, without wall quenching, for lower smoke, particulates and hydrocarbons than a diesel engine. While reducing wall contact and quenching, the burn rate is faster, which can be used to further control $NO_x$ by retarding injection/ignition timing. With the combination of compression ratios lower than required by diesels but higher than acceptable for conventional gasoline engines; positive ignition without delay of fuel injected directly into the chamber and quick burn is achieved. The combustion system is insensitive to the fuel's chemical composition or quality octane or cetane numbers, speed, load or ambient conditions, which achieves the promises of a multi-fuel capability.

The combustion sequence, initially starting in a small, shallow portion of the combustion chamber with high surface to volume ratio, essentially produces a relatively cool flame and reduced $NO_x$. The main combustion, however, takes place in the larger volumes of the chamber, occurs late in the cycle after the piston is past TDC and is descending. The main combustion is efficient because it takes place in a volume with low surface-to-volume ratio, far from the injector, with the fuel and burning mixture staying airborne, with minimum contact with the chamber top bottom or back wall (in sharp contrast to conventional diesel engines). But the main combustion is in close proximity with the hot exhaust valves, proceeds very rapidly. Resultantly, it is a low smoke producer, a low HC and particulate generator, and also a low $NO_x$ producer because it burns essentially late in the cycle and very rapidly. In essence it can be said that this cycle approaches the initial desire of Dr. Diesel for a Constant-Pressure cycle.

Two additional benefits arise from the type of construction shown by FIGS. 4, 5 and 6. The injection nozzle enters the engine from the inlet side at a very flat angle with the fuel injection pump logically mounted on the same side of the engine. With the subject pump-line and nozzle fuel injection system, the length of line for fuel flow is very short, reducing the negative problems of fuel injection system line dynamics and greatly reducing the "tail ends" of injection for reduced baseline emissions of HC, smoke and particulates, as well as improved power output and fuel consumption.

Furthermore, this stratified-charge engine 10 can be easily converted from present day conventional gasoline spark ignited engines. This allows use of essentially the same engine short block, easily modified cylinder heads, and pistons to take advantage of economy of scale. This allows much interchangeability of parts with a conventional gasoline engine. The ease of modification and interchangeability allows this engine to be feasible and easily manufactured, especially if proper considerations are taken early on in the design stages.

Variations and modifications are possible without departing from the scope and spirit of the present invention as defined by the appended claims.

The embodiments in which an exclusive property or privilege is claimed are defined as follows:

1. In an internal combustion engine having a cylinder with a side wall, a piston movably disposed in said cylinder for reciprocal motion along a central longitudinal axis of said cylinder and a cylinder head secured over said cylinder to form a combustion chamber with said cylinder and piston, the cylinder head defining two intake ports each with an intake valve for selectively allowing air to be admitted into said combustion chamber and two exhaust ports each with an exhaust valve for selectively allowing exhaust gases to exit said combustion chamber, the improvement characterized by:

a fuel injector means for spraying an expanding fuel stream from a nozzle thereof into said combustion chamber from a peripheral section of said combustion chamber substantially spaced from said central axis of said cylinder toward said cylinder side wall at an approximately transverse direction with respect to said central axis of said cylinder;

said piston having a concave recess section with a variable width, said width being relatively narrow in proximity with said fuel injection means and becoming wider away from said fuel injection means, said concave recess having a variable depth, said depth being relatively shallow in proximity with said fuel injection means and becoming deeper at a point away from said fuel injector means;

fuel igniter means for sequentially igniting said fuel sprayed into said combustion chamber at two different times with an initial ignition and a second ignition such that said initial ignition occurs after said fuel injector means injects a first amount of fuel into said combustion chamber with said fuel injector means injecting additional fuel into said combustion chamber after said initial ignition occurs and said second ignition occurs after said additional fuel is sprayed into said combustion chamber.

2. In an internal combustion engine as defined in claim 1 further characterized by:
said intake ports, valves, cylinder head and piston constructed to provide and promote air tumble within said combustion chamber about an axis that is substantially transverse to the central longitudinal axis of said cylinder before the initial ignition.

3. In an internal combustion engine as defined in claim 1 further characterized by:
said fuel igniter means for providing said initial and second ignitions includes a first igniter located in proximity to said nozzle of said fuel injector means and a second igniter located downstream of said expanding fuel stream from said first igniter with said first igniter providing the initial ignition and the second igniter providing the sequential second ignition.

4. In an internal combustion engine as defined in claim 3 further characterized by:
said first igniter and said second igniter being substantially vertically aligned above said piston, said second igniter positioned closer to said central longitudinal axis of said cylinder than said first igniter;

5. In an internal combustion engine as defined in claim 3 further characterized by;
said fuel injector means being aimed to spray said additional fuel through a flame front caused by said initial ignition from said first igniter of said first amount of fuel injected into said combustion chamber;
said additional fuel being sprayed to reach said second igniter before said flame front to be ignited downstream of said flame front by said second igniter.

6. In an internal combustion engine as defined in claim 5 further characterized by:
said intake ports, intake valves, cylinder head and piston being constructed to provide and promote air tumble within said combustion chamber about an axis that is substantially transverse to the central longitudinal axis of said cylinder before said initial ignition.

7. In an internal combustion engine as defined in claim 6 further characterized by:
said cylinder head constructed to provide the intake and exhaust valves being set a valve included angle of less than 30°.

8. In an internal combustion engine as defined in claim 7 further characterized by:
said bore/stroke ratio of said engine being less than unity.

9. In an internal combustion engine as defined in claim 6 further characterized by:
said bore/stroke ratio of said engine being less than unity.

10. In an internal combustion engine having a cylinder with a side wall, a piston disposed in said cylinder for motion within said cylinder and a cylinder head secured over said cylinder to form a combustion chamber with said cylinder and piston, two intake valves for allowing air to be admitted into said combustion chamber and two exhaust valves for allowing exhaust gases to exit said combustion chamber, the improvement characterized by:
a fuel injector means for spraying fuel from a nozzle thereof into said combustion chamber;
fuel igniter means for sequentially igniting said fuel sprayed into said combustion chamber at two different times with an initial ignition and a second ignition, such that said initial ignition occurs after said fuel injector means injects a first amount of fuel into said combustion chamber with said fuel injector means injecting additional fuel into said combustion chamber after said initial ignition occurs and said second ignition occurs after said additional fuel is sprayed into said combustion chamber.

11. In an internal combustion engine as defined in claim 10 further characterized by:
said intake ports, valves, cylinder head and piston being constructed to provide and promote air tumble within said combustion chamber about an axis that is substantially transverse to the central longitudinal axis of said cylinder before said initial ignition.

12. In an internal combustion engine as defined in claim 11 further characterized by:
said cylinder head being constructed to provide the intake and exhaust valves being set at a maximum valve included angle less than 30°.

13. In an internal combustion engine as defined in claim 10 further characterized by:
said fuel igniter means includes a first igniter and a second igniter mounted in said cylinder head substantially vertically aligned above said piston, said second igniter positioned closer to a central longitudinal axis of said cylinder than said first igniter.

14. In an internal combustion engine having a cylinder with a side wall, a piston movably disposed in said cylinder for reciprocal motion along a central longitudinal axis of said cylinder and a cylinder head secured over said cylinder to form with said cylinder and piston a combustion chamber, at least one intake valve for allowing air to be admitted into said combustion chamber and at least one exhaust valve for allowing exhaust gases to exit said combustion chamber, the improvement characterized by:
a fuel injector means for spraying an expanding fuel stream from a nozzle thereof into said combustion chamber from a peripheral section of said combustion chamber substantially spaced from said central axis of said cylinder toward said cylinder side wall at an approximately transverse direction with respect to said central longitudinal axis of said cylinder;
said piston having a converse recess section with a variable width, said width being relatively narrow in proximity with said fuel injector means and becoming wider away from said fuel injector means, said concave recess having a variable depth, said depth being relatively shallow in proximity with said fuel injector means and becoming deeper at a point away from said fuel injector means;
a first igniter mounted in said cylinder head in proximity to said nozzle of said fuel injector means;
a second igniter mounted in said cylinder head downstream from said first igniter in said expanding fuel stream form said first igniter;

said intake ports, valves, cylinder head and piston being constructed to provide and promote air tumble within said combustion chamber about and axis that is substantially transverse to the central longitudinal axis of said cylinder whereby the flow of air contacts said fuel stream near said first igniter for an initial ignition and then flows past said second igniter for further ignition.

15. In an internal combustion engine as defined in claim 14 further characterized by:
said first igniter and said second igniter being substantially vertically aligned above said piston, said second igniter being positioned closer to said central longitudinal axis of said cylinder than said first igniter;

16. In an internal combustion engine as defined in claim 14 further characterized by:
said cylinder head being constructed to provide the intake and exhaust valves being set at a valve included angle of less than 30°.

17. In an internal combustion engine as defined in claim 16 further characterized by:
said bore/stroke ratio of said engine being less than unity.

18. In an internal combustion engine as defined in claim 14 further characterized by:
said bore/stroke ratio of said engine being less than unity.

19. In an internal combustion engine having a cylinder with a side wall, a piston movably disposed in said cylinder for reciprocal motion along a central longitudinal axis of said cylinder and a cylinder head secured over said cylinder to form with said cylinder and piston a combustion chamber with an upper wall, piston bottom wall and a side wall, intake valves for allowing air to be admitted into said combustion chamber and exhaust valves for allowing exhaust gases to exit said combustion chamber, the improvement characterized by:
a fuel injector means for spraying an expanding fuel stream from a nozzle thereof into said combustion chamber from a side wall of said combustion chamber at an approximately transverse direction with respect to said central longitudinal axis of said cylinder;
said piston having a converse recess being eccentrically positioned in said piston with respect to a central horizontal axis of said piston, said eccentrically positioned recess having a variable width, said width being relatively narrow in proximity with said fuel injector means and becoming wider away from said fuel injector means, said recess having a variable depth, said depth being relatively shallow in proximity with said fuel injector means and becoming deeper at a point away from said fuel injector means; said recess having a longitudinal axis aligned with said transverse direction of said expanding fuel stream;
fuel igniter means for sequentially igniting said fuel sprayed into said combustion chamber at two different times with an initial ignition and a second ignition, such that said initial ignition occurs after said fuel injector means injects a first amount of fuel into said combustion chamber with said fuel injection means injecting additional fuel into said combustion chamber after said initial ignition occurs and said second ignition occurs after said additional fuel is sprayed into said combustion chamber.

20. In an internal combustion engine as defined in claim 19 further characterized by:
said igniter means for providing said initial and second ignitions includes a first igniter located in proximity to said nozzle of said fuel injector means and a second igniter located downstream of said expanding fuel stream from said first igniter with said first igniter providing the initial ignition and the second igniter providing the sequential second ignition.

21. In an internal combustion engine as defined in claim 20 further characterized by:
said first igniter and said second igniter being substantially vertically aligned above said piston, said second igniter positioned closer to said central longitudinal axis of said cylinder than said first igniter;

22. In an internal combustion engine as defined in claim 19 further characterized by:
said recess being asymmetrically shaped with the deepest part of said recess offset from the longitudinal axis of said recess, said second igniter eccentrically positioned from the longitudinal axis of said recess and being offset toward the

* * * * *